US007702695B2

(12) United States Patent
Mehra et al.

(10) Patent No.: US 7,702,695 B2
(45) Date of Patent: Apr. 20, 2010

(54) OBJECT RELATIONAL MAP VERIFICATION SYSTEM

(75) Inventors: Krishna Mehra, Bangalore (IN);
Sriram K. Rajamani, Bangalore (IN);
Aravinda P. Sistla, Glenview, IL (US);
Sumit K. Jha, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 11/769,112

(22) Filed: Jun. 27, 2007

(65) Prior Publication Data

US 2009/0006463 A1 Jan. 1, 2009

(51) Int. Cl.
*G06F 7/00* (2006.01)
*G06F 17/30* (2006.01)
*G06F 9/44* (2006.01)

(52) U.S. Cl. .................. 707/802; 717/124; 717/126
(58) Field of Classification Search ................ None
See application file for complete search history.

(56) References Cited

U.S. PATENT DOCUMENTS

| | | | | |
|---|---|---|---|---|
| 6,175,837 | B1 * | 1/2001 | Sharma et al. | ........... 707/103 Y |
| 6,243,710 | B1 | 6/2001 | DeMichiel et al. | |
| 6,430,556 | B1 | 8/2002 | Goldberg et al. | |
| 6,496,833 | B1 | 12/2002 | Goldberg et al. | |
| 2001/0018690 | A1 | 8/2001 | Ng et al. | |
| 2002/0062475 | A1 * | 5/2002 | Iborra et al. | ................. 717/108 |
| 2006/0041584 | A1 | 2/2006 | Debertin et al. | |
| 2006/0184568 | A1 | 8/2006 | Barcia | |
| 2006/0195476 | A1 | 8/2006 | Nori et al. | |
| 2007/0006314 | A1 * | 1/2007 | Costa et al. | .................... 726/25 |
| 2007/0055647 | A1 | 3/2007 | Mullins et al. | |
| 2008/0244510 | A1 * | 10/2008 | Cote | .......................... 717/108 |

OTHER PUBLICATIONS

Abel, Andreas et al., Connecting a Logical Framework to a First-Order Logic Prover (Extended Version), 2005 (26 pages).
Andre, Yves et al., "On First-Order Constraint Checking in Object-Oriented Databases," 1999 (21 pages).
Demolombe, Robert, "An Extended Relational Algebra on Abstract Objects for Summarizing Answers to Queries," Fundamenta Information 57, 2003 (pp. 1-15).
Hibernate, Relational Persistence for Java and .NET, Copyright 2006, Red Hat Middleware LLC (4 pages) http://www.hibernate.org [Accessed Mar. 27, 2007].

* cited by examiner

*Primary Examiner*—Uyen T. Le
(74) *Attorney, Agent, or Firm*—Perkins Coie LLP

(57) ABSTRACT

An object relational map verification system is described. In some embodiments, the object relational map verification system can verify object relational maps and identify counterexamples when an object relational map cannot be verified. The object relational map verification system can verify an object relational map by (1) receiving objects, database schemas, query views, and update views; (2) generating first order logic formulae corresponding to the received objects, database schemas, query views, and update views; and (3) proving theorems indicated by the generated first order logic formulae. When the theorems are proved, the object relational map is verified. In some embodiments, the object relational map verification system can also generate models illustrating counterexamples when the theorem cannot be proved. The counterexamples provide data that the object relational map does not consistently store and then retrieve.

17 Claims, 3 Drawing Sheets

OBJECT RELATIONAL MAP VERIFICATION SYSTEM

BACKGROUND

Producing sophisticated software can involve many man-hours of software developers' effort to produce software code. To improve the understandability and maintainability of software code, software developers began using object-oriented programming techniques. Software code that was developed using object-oriented programming techniques generally encapsulated functionality into objects. As an example, when software accesses a database to store or retrieve data, the software may contain a database access object that other objects employ to access the database. Objects generally have attributes and methods. Attributes can store values. Other code in the software, such as other classes, can invoke the methods to manipulate the object's attributes or take various actions.

Objects can define complex data relationships. As an example, an object representing an address book can reference objects corresponding to multiple person objects, with each person object having an associated name, multiple addresses, multiple phone numbers, and so forth. The person object may include a method to return a preferred telephone number. The person object can be referenced as a single value in a variable. In contrast, a database can be defined using a database schema comprising tables and columns that is relational and so different from objects. Data can be stored in rows of each database table. Each row's data can comprise scalars, such as strings, integers, and so forth. No one column of a table contains the equivalent of a person object. Instead, the person object's attributes can be distributed among several columns, such as name, address, phone number, and so forth.

When developing a database access object, developers generally develop code to access the database. As an example, to store and retrieve address book entries, a developer may develop a database object that maps data from a person object's attributes to database column values and vice versa. However, every time the object's structure or the database schema changes, the code may need to be modified to conform to the change. The code would need to determine which tables and columns are needed to satisfy a particular database operation and produce corresponding database queries. This can involve substantial software development and testing effort.

Developers sometimes employ object relational mapping (ORM) techniques to simplify the understandability and maintainability of objects that access databases or, more generally, anytime two objects of different types exchange data. An object relational map identifies the mapping between two object types, such as a database object that accesses a database and the database itself. ORM techniques can be employed whenever transformation of data occurs from one complex type to another. ORM techniques map objects to database schemas to produce database queries automatically so that developers do not need to develop and maintain code for accessing databases. Using such techniques, a developer can map an object's attributes to database columns. ORM techniques produce suitable database access queries when an object accesses a corresponding database. However, developers and testers need to ascertain that the ORM techniques are producing correct database queries. In other words, developers need to know that an object relational map causes data that is stored to be equivalent to data that is retrieved. This is known in the art as a "round-trip" data analysis.

SUMMARY

An object relational map verification system is described. The object relational map verification system can verify object relational maps and identify counterexamples when an object relational map cannot be verified. The object relational map verification system can verify an object relational map by (1) receiving objects, database schemas, query views, and update views; (2) generating first order logic formulae corresponding to the received objects, database schemas, query views, and update views; and (3) proving theorems indicated by the generated first order logic formulae. When the theorems are proved, the object relational map is verified. The object relational map verification system can also generate models illustrating counterexamples when the theorem cannot be proved. The counterexamples provide data to indicate that the object relational map does not consistently store and then retrieve.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
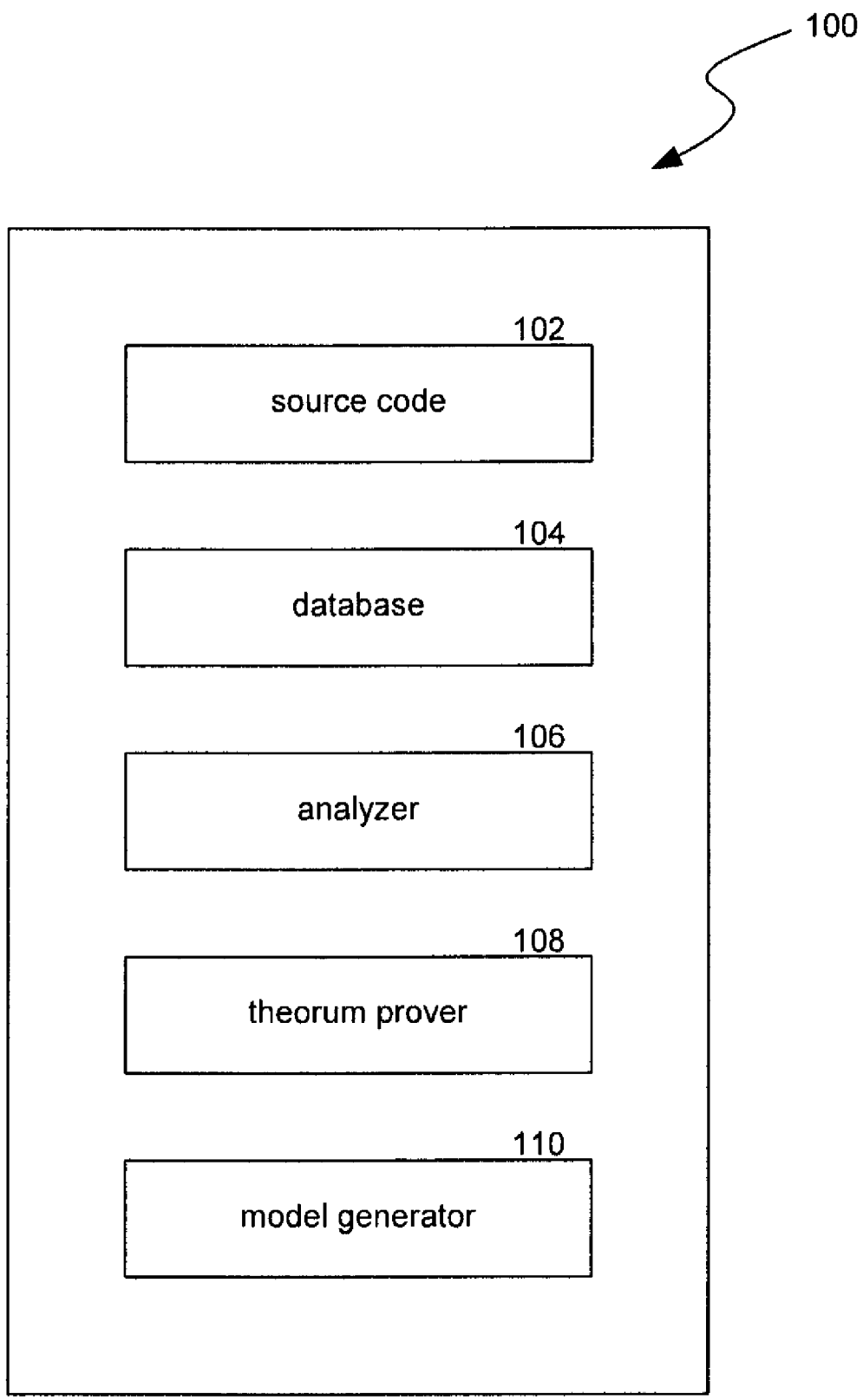
FIG. 1 is a block diagram illustrating components of an object relational map verification system in various embodiments.

An object relational map verification system is described. The object relational map verification system verifies that an object relational map is valid. An object relational map is invalid when data that is retrieved to repopulate the attributes is not equivalent to the data that is stored based on an object's attributes. In various embodiments, the object relational map verification system verifies an object relational map by (1) receiving objects, database schemas, query views, and update views; (2) generating first order logic formulae corresponding to the received objects, database schemas, query views, and update views; and (3) proving theorems indicated by the generated first order logic formulae. When the theorems are proved, the object relational map is verified. The object can be received in object code or source code. In some embodiments, the object relational map verification system generates a first order logic formula based on the object code or source code. In some embodiments, the object relational map verification system can receive first order logic formulae from software developers. The object relational map verification system can receive database schemas specifying portions of databases into which attributes of the received object will be stored or from which the attributes will be retrieved. In some embodiments, the object relational map verification system can determine database schemas, such as by querying a database management system. The query views specify in a query language, such as in ESQL, the information that is retrieved from the database. ESQL is a type of structured query language that relational database management systems implement. As an example, the query view may be an ESQL SELECT statement that identifies tables and columns of a database that match a specified condition that are to be retrieved to populate an object's attributes. The update views specify information that is stored in the database. As an example, the update view may be an ESQL UPDATE statement that identifies the tables and columns that are to be updated based on the object's stored attributes. A first order logic formula is a formula that is defined by a predicate calculus comprising formation rules, transformation rules, and axioms. In various embodiments, the first order logic formula can be derived by the object relational map verification system based on the object, database schema, query view, and update view. The first order logic formula can subsume predicate logic by adding variable quantification, and can include axioms that are provided and theorems that need to be proven. The first order logic formula expresses the object relational map formally. The object relational map verification system can then prove the theorem indicated by the first order logic formula. As an example, the object relational map verification system can employ a theorem prover to prove the formula. When the theorem is proved, the object relational map is verified.

In some embodiments, the object relational map verification system generates models illustrating counterexamples. The counterexamples provide data that the object relational map does not consistently store and then retrieve. As an example, if the theorem cannot be proved, the object relational map verification system can generate examples of data that illustrate how the object relational map is incorrect. The object relational map verification system can generate counterexamples by translating the generated first order logic formula into a Boolean satisfiability problem instance and searching for the model by using a Boolean satisfiability problem solver. A Boolean satisfiability problem solver receives an expression comprising multiple variables and identifies values for the variables so that the formula evaluates to true (or false). The object relational map verification system can parameterize (e.g., vary) (1) a maximum bound on the number of "tuples" in every relation k and (2) the number of constants in a domain c. A tuple is a sequence of objects, such as variables. The object relational map verification system encodes the first order logic formula into a quantified Boolean formula that can be converted to a satisfiability problem expression. The object relational map verification system can employ binary decision diagrams to optimize quantifications. Binary decision diagrams are described by R. E. Bryant, "Graph-Based Algorithms for Boolean Functional Manipulation," IEEE Trans. Computers 35(8):677-691, which is incorporated herein by reference. The object relational map verification system can convert binary decision diagrams into a set of conjunctive normal form clauses. A conjunctive normal form clause is a conjunction of Boolean clauses. A satisfiability problem solver can then provide a model based on the conjunctive normal form clauses by assigning variables so that the expression resolves to a true (or false) result. If the satisfiability problem solver is unable to identify a model, the object relational map verification system can increase the k and c values and re-attempt to identify a solution.

Thus, the object relational map verification system can verify object relational maps and identify counterexamples when an object relational map cannot be verified. The object relational map verification system will now be described using examples. Suppose an entity set Orders(id, amount) has two relations:

1. SmallOrders(id, amount) for orders with amount less than $100, and
2. BigOrders(id, amount) for orders with amount greater than or equal to $100.

Suppose the object relational map verification system is given the following update view for SmallOrders:

SELECT (id,amount)  FROM Orders
WHERE amount < 100

Further, suppose that the object relational map verification system is given the following update view for BigOrders:

SELECT (id,amount)  FROM Orders
WHERE amount >= 100

The object relational map verification system can translate these views into first order logic (FOL) formulae given in $A_1$ and $A_2$ in Table 1.

TABLE 1

Axioms and Conjectures for Example 1

| $A_1$ | $\forall x, y$ | SmallOrders(x, y) | $\Leftrightarrow$ (Orders(x, y) $\wedge$ (y < 100)) |
| $A_2$ | $\forall x, y$ | BigOrders(x, y) | $\Leftrightarrow$ (Orders(x, y) $\wedge$ (y $\geq$ 100)) |
| $A_3$ | $\forall x, y$ | Orders$_{new}$(x, y) | $\Leftrightarrow$ (SmallOrders(x, y) $\vee$ BigOrders(x, y)) |
| $A'_2$ | $\forall x, y$ | BigOrders(x, y) | $\Leftrightarrow$ (Orders(x, y) $\wedge$ (y > 100)) |
| C | $\forall x, y$ | Orders$_{new}$(x, y) | $\Leftrightarrow$ Orders(x, y) |

The object relational map verification system can translate the following query view for Orders:

SELECT (id,amount)  FROM SmallOrders
        UNION ALL
SELECT (id,amount)  FROM BigOrders into the FOL formula given in $A_3$ of Table 1. Orders$_{new}$ is a new relation. The object relational map verification system can then formulate the round-trip verification condition as proving the conjecture C using the axioms $A_1$, $A_2$, and $A_3$, which can be readily proved by using a conventional FOL theorem prover.

Now, suppose the developer made a mistake and wrote the update view for BigOrders as:

SELECT (id,amount)  FROM Orders
WHERE amount > 100

This translates to the FOL formula in $A_2$' in Table 1. If the object relational map verification system attempts to prove conjecture C using the axioms $A_1$, $A_2$', and $A_3$, it will be unable to do so because the theorem prover will fail or report an error.

By using a model generator, the object relational map verification system can generate a counter model: Orders={(1,100)}, SmallOrders={ }, BigOrders={ }, and Orders$_{new}$={ }.

While the above examples illustrate both correct and incorrect object relational maps, they are simplistic. Realistic object relational maps include object-oriented features that complicate translation to FOL. To illustrate some of these complications, consider the following entity schema types: (1) CPersonType(id, name), and (2) CCustomerType(addr: AddressType(state, zip)): CPersonType. Here CCustomerType inherits from CPersonType and adds an extra property addr, which is of a complex type AddressType with two fields state and zip. Suppose the database schema has only one type SPersonType(id, name, state, zip). Further, suppose the source code defines one entity set CPersons in the object model of type CPersonType, and one entity set SPersons in the database of type SPersonType. Table 2 contains the axioms and conjectures for this example.

TABLE 2

Axioms and Conjectures for Example 2

| | | |
|---|---|---|
| $A_1$ | $\forall V, x, y, z$ | CCustomerType (V, x, y, z) $\Rightarrow$ CPersonType(V, x, y) |
| $A_2$ | $\forall x, y, z, w$ | $\left( \begin{array}{l} \text{CPersonType(CPersons, x, y)} \wedge \\ \exists a. \left[ \begin{array}{l} \left( \begin{array}{l} \text{CCustomerType(CPersons, x, y, a)} \vee \\ (\neg \exists b \text{CCustomerType(Cpersons, x, y, b)} \wedge a = \text{null}) \end{array} \right) \\ \left( \begin{array}{l} \text{AddressType(a, z, w)} \vee \\ \neg \text{AddressType(a, z, w)} \wedge z = \text{null} \wedge w = \text{null}) \end{array} \right) \end{array} \right] \wedge \end{array} \right)$ |
| | | $\Leftrightarrow$ Sperson(SPersons, x, y, z, w) |
| $A_3$ | $\forall (x, y, z, w)$ | $\left( \begin{array}{l} \text{SPersonType(SPersons, x, y, z, w)} \wedge \\ \neg (w = \text{null}) \wedge \exists a \text{ AddressType(a, z, w)} \end{array} \right)$ |
| | | $\Leftrightarrow$ CCustomerType(CPersons$_{new}$, x, y, a) |
| $A_4$ | $\forall (x, y, z, w)$ | SPersonType(SPersons, x, y, z, w) $\wedge$ (w = null) |
| | | $\Leftrightarrow$ CPersonType(CPersons$_{new}$, x, y) |
| $C_1$ | $\forall (x, y)$ | CPersonType(CPersons, x, y) $\Leftrightarrow$ CPersonType(CPersons$_{new}$, x, y) |
| | $\forall (x, y, a)$ | CCustomerType(CPersons, x, y, a) $\Leftrightarrow$ CCustomerType(CPersons$_{new}$, x, y, a) |

A complication in developing a FOL representation is that CPersons can have objects of type both CPersonType and CCustomerType. In some queries, an object of type CCustomerType might be cast into its supertype CPersonType, and later downcast into an object of type CCustomerType. To handle such cases uniformly, the object relational map verification system can create one relation in the FOL for each type in the entity schema. The actual entity set is present as a name in the first attribute of the relation. In this current example, since there are two types CPersonType and CCustomerType, there can be two FOL relations CPersonType(r, id, name) and CCustomerType(r, id, name, a), where a is of type AddressType. Conceptually, a can be treated as being a foreign key that indexes in AddrType. Since AddrType is a complex type, the FOL relation can be represented as AddressType(a, state, zip), where a is the key of the relation. Inheritance is modeled using the axiom $A_1$, which states that every CCustomerType object is also a CPersonType object.

Suppose the object relational map verification system is given an update view U for SPersons as:

```
SELECT  id, name,
        TREAT(CPersons as CCustomerType).addr.state,
        TREAT(CPersons as CCustomerType).addr.zip
FROM    CPersons
```

Translating this to FOL can be more complicated than in the pure relational case. Axiom $A_2$ relates SPersons to CPersons, taking into account that objects in CPersons could be either of type CPersonType or type CCustomerType. In the latter case, the last attribute of CCustomerType is a foreign key a for the relation AddressType.

Suppose the query view Q for CPersons is given by the following ESQL statement:

```
SELECT  VALUE CCustomerType(id, name, addr)
FROM
        SELECT id, name,
               AddressType(state, zip) AS addr
        FROM SPersons
        WHERE !IsNull(Spersons.zip)
```

-continued

```
UNION ALL
SELECT  VALUE CPersonType(id, name) FROM
        SELECT id, name FROM SPersons
        WHERE IsNull(Spersons.zip)
```

Then, the object relational map verification system can generate the FOL formula for Q as in $A_3$ and $A_4$. To prove the round-trip condition, the theorem prover proves the conjecture $C_1$, which states that CPersons and CPersons$_{new}$ are equivalent using axioms $A_1$, $A_2$, $A_3$, and $A_4$.

In general, a view is defined by an ESQL command e of the form SELECT p FROM r WHERE c, in which p, r and c may all contain object-oriented constructs. The object relational map verification system can translate such expressions to FOL formulae inductively using a function F from query expressions. F(e) is defined in terms of F(p), F(r), and F(c). To perform the translation inductively, the object relational map verification system maintains a list of variables E(e) that need to be existentially quantified and a formula B(e) that defines bindings to these variables. This inductive translation is described in further detail below.

Extended Relational Algebra

The following describes the syntax and semantics of an Extended Relational Algebra (ERA). The full formal semantics are described at the document referenced by "research.microsoft.com/~sriram/roundtripTR.pdf," which is incorporated herein by reference.

The syntax of the ERA can be described using Backus-Naur Form (BNF) notation given in Table 3.

TABLE 3

BNF for Extended Relational Algebra

| | | | |
|---|---|---|---|
| Types | $\tau ::=$ | int\|bool\|string | (base types) |
| | | \|id$(\tau_1,\tau_2,...,\tau_n)$ | (complex type) |
| | | \|id$(\tau_1,\tau_2,...,\tau_n)::\tau$ | (subtype) |
| | | \|ref$_\tau(\tau_1,\tau_2,...,\tau_r)$ | (ref type) |
| Relations | $r ::=$ | eid | (table name) |
| | | \|$\rho_s(r)$ | (rename r to s) |
| | | \|$\sigma_c(r)$ | (select) |
| | | \|$\Pi_{p1,p2,...,pk}(r)$ | (project) |
| | | \|$r_1 \times r_2$ | (cross product) |
| | | \|$r_1 \cup r_2$\|$r_1 \backslash r_2$ | (set operations) |
| Entity Expression | $e ::=$ | s | (identifier, table name) |
| | | \|treat e as $\tau$ | (type cast) |
| | | \|*p | (dereference) |
| Property Expressions | $p ::=$ | f | (field) |
| | | \|& e | (address) |
| Field | $f ::=$ | e.i | (field access) |
| | | \|f.i | (subfield access) |
| Conditions | $c ::=$ | isof(e,r) | (type check) |
| | | \|isnull(p) | (null check) |
| | | \|$p_1 = p_2$ | (value equality check) |
| | | \| $c_1 \wedge c_2$ \| $c_1 \vee c_2$ \| $\neg c$ | (Boolean combinations) |

The basic operators in the ERA are σ(Selection), ρ(Renaming), Π(Projection), ×(cross product), and the set union and difference. The syntax also has type casting, type checking, pointer referencing, and dereferencing, etc.

The grammar has six non-terminal symbols. Among these, τ defines types. The object relational map verification system can assume that in the definition of a type the name id uniquely identifies the type. Each expression generated from a relation r is an ERA expression. Semantically, it denotes a set of entities or simply a relation. The non-terminating symbols e, p, and f define entity, property, and field expressions, respectively. Finally c defines conditions. Each expression generated from the non-terminating symbol e denotes a single entity or tuple. In the first rule for e, s is an entity set or an identifier/variable that renames an entity set. In the entity expressions, the expressions treat e as τ casts an entity of a base type to one of its subtypes or vice versa. It also generates the address (&) and dereferences an address (*). Note that "·" is used to access attributes of an entity, while the "·" notation is used to access subfields of a complex type.

ERA Semantics

An EDM database D is a triple (T, ESN, type), where T is a set of types, ESN is a set of entity sets, and type is a function that associates a type with each entity set. The object relational map verification system assumes that there is a function key that given an entity type τ gives the fields in the entity that define the key for the entity sets of that type.

An ERA expression is a string generated from the non-terminating symbol r. An ERA expression is said to be a rename operation if it is of the form $\rho_s(r')$. A rename operation renames an entity set eid with the variable s if either r'=eid or r' itself renames eid with some variable s'. A variable s refers to the entity set eid in ERA expression r' if there is a subexpression r of r' that renames eid with s and r does not appear in the scope of a projection or another rename operation and does not appear in the scope of ∪ or \. An entity set eid can be viewed as a variable when used in an entity expression. In this case, eid references eid in r, if eid appears as a subexpression in r and does not appear in the scope of a projection, rename, ∪ or \.

As an example, consider the entity type CPersonType(id, name) and its subtype CCustomerType(addr:AddressType (state,zip)): CPersonType as described above. Let COrderType(Oid,Odesc) be another entity type. Let CPersons and COrders be entity sets of types CPersonType and COrderType, respectively. In the ERA expression $\rho_s$(CPersons)× COrders, s refers to the entity set CPersons. On the other hand, in the ERA expression $\rho_t(\rho_s$(CPersons))×COrders, s does not refer to the entity set CPersons.

For every w which is either an entity, or a property or a field expression, and for every ERA expression r, the object relational map verification system can define expr_type(w,r), which is the type of w in r, and also define Var(w,r), which is the variable that w denotes in r. For an entity expression w that does not contain *, Var(w) is the entity set variable specified in w. Furthermore, if w does not contain treat, then expr_type (w,r) is the entity type referenced by Var(w). If w contains treat, then expr_type(w,r) may be the type mentioned in the treat clause. If w contains *, then Var(w)=Null; and expr_type (w,r) is the type of entity the pointer points to. For an entity expression w=e, Var(e,r) and expr_type(e,r) can be defined as follows:

If e=s then Var(e,r)=s. Furthermore, if s references an entity set eid in r, then expr_type(e,r)=type(eid).

If e=treat e' as τ then Var(e,r)=Var(e',r). In this case, if τ is a subtype of expr_type (e',r) then expr_type(e,r)=τ; otherwise, expr_type (e,r)=expr_type(e',r).

If e=*p and expr_type(p,r)=ref$_\tau$ for some entity type τ, then Var(e,r)=Null and expr_type(e,r)=τ.

For a property or a field expression w, Var(w,r) and expr_type(w,r) can be defined as follows:

If w is the property expression &e, then Var(w,r)=Null. In this case, if expr_type(e,r)=τ then expr_type(w,r)=ref$_\tau$.

For a property expression w, if w=f where f is a field expression, expr_type(w,r)=expr_type(f,r), and Var(w, r)= Var(f,r).

If w is a field expression then the object relational map verification system can do as follows: w=e·$i_1$·$i_2$ ... ·$i_k$ for some entity expression e. If expr_type(e,r)=id($\tau_1$, ..., $\tau_n$) then expr_type(w,r) is defined to be the type of the subattribute (id·$i_1$· ... ·$i_k$). If e does not contain * then Var(w,r)=s·$i_1$· ... ·$i_k$ where s=Var(e,r). If e contains *, then Var(e,r)=Null.

Formulation

Let P be the set of all physical database states, and E be a set of all entity database states. Consider two ERA relational expressions: (1) an update view U, and (2) a query view Q. Semantically, U:E→P and Q:P→E.

The round-trip condition from the entity side suggests that Q·U be the identity map. However this may not hold as it does not take into consideration the integrity constraints the entities and databases are supposed to satisfy. The pair of maps (U,Q) satisfy the round-trip condition from the entity side, if $\forall s \in E'Q(U(s))=s$ where E' is the set of all elements of E that satisfy the integrity constraints of the EDM data declaration and P' is the image of E' under the mapping U (e.g., P'= {U(s):s∈E'}). This condition is equivalent to requiring that Q·U' be the identity function on domain E' where U' is the mapping which is a restriction of U to E'. Similarly, the pair (U,Q) satisfies the round-trip condition from the database side if $\forall t \in P'U(Q(t))=t$. This condition provides the following Lemma that can be proved by a theorem prover:

Lemma 1: $\forall t \in P'U(Q(t))=t$ iff $\forall t \in E'Q(U(t))=t$. The object relational map verification system checks if a pair (U,Q) satisfies the following round-trip condition: $\forall s \in E'Q(U(s))=s$.

The object relational map verification system translates the ERA relational expressions U and Q into FOL, and uses FOL theorem prover to check the round-trip condition.

Translation of ERA to FOL

Corresponding to the EDM database $D=(T, ESN, type)$, a canonical relational database E can be defined. As indicated earlier, for each type $\tau=id(\tau_1, \ldots, \tau_n)$, there is a relation id(name, $a_1, \ldots, a_m$) where name is an entity set (its name) if $\tau$ is an entity type, otherwise name is of type integer that is a key for the relation. If $\tau_i$ is of complex type id'$(\tau_1', \ldots, \tau_k')$, then $a_i$ is of type integer and is a foreign key referencing the table id'$(\tau_1', \ldots, \tau_k')$.

Some complex types and subtypes are entity types. For each such type $\tau=id(\tau_1, \ldots, \tau_n)$ a relation pkey$_\tau$ captures the one-to-one relationship between pointers to entities in entity sets and keys of such entities. The "arity" of pkey$_\tau$ is $k+2$ where key$(\tau)=(\tau_{i_1}, \ldots, \tau_{i_k})$. The object relational map verification system can check that the following are true: (a) p is the key of this relation (e.g., no two tuples have the same p values); (b) the attributes u, $d_1, \ldots, d_k$ form a key indicating that this is a one-to-one relationship; (c) for each entity set u of type $\tau$ and for each key value present in the relation u, there exists a tuple in pkey$_\tau$ with the same values for $d_1, \ldots, d_k$; and (d) for each entity set eid and for every tuple t in pkey$_\tau$ such that t·u=eid, there exists a tuple in eid with the same key values as t·$d_1$, t·$d_2, \ldots,$ t·$d_k$.

For each relational expression r' generated by r, define a FOL formula F(r'). This formula has the property that in any database state s, the result of evaluating r' on s provides a relation that is equivalent to the set of "tuples" that satisfy F(r') in the interpretation s. Similarly, for each expression f, which is an entity expression or property or field or condition, the object relational map verification system generates a formula F(f). For an expression f, which is an entity expression or property or field, the object relational map verification system generates a set E(f) of variables that need to be quantified and a formula B(f) that defines a binding on these variables. F(f), E(f), and B(f) not only depend on f, but they also depend on the ERA expression r in whose context they are being defined.

For any FOL formula F, let free free_var(F) denote the sequence of free variables that appear in F. The ordering of these variables can be specified. For a sequence of variables $\vec{X}$ of the same length as free_var(F), let F($\vec{X}$) denote the formula obtained by substituting the variables in $\vec{X}$ for the free variables in F in the specified order. For each identifier g, there is a set of first order variables {g·i:i≧1}. For each relational expression r', F(r') is defined inductively based on its outer most connective, as follows. The object relational map verification system also defines a vector free_var(F(r')) of variables that appear free in F(r').

r'=eid: F(eid)=id(eid, eid·1, ..., eid·n) and free_var(F(r'))= (eid·1, ..., eid·n) where type(eid)=id($\tau_1, \ldots, \tau_n$).

r'=$\rho_s$(r): F(r')=F(r)($\vec{Y}$) and free_var(F(r'))=($\vec{Y}$) where n is the number of free variables in F(r) and $\vec{Y}$=(s·1, ..., s·n). This translation renames the free variables in F(r) to be those in $\vec{Y}$.

r'=$\sigma_c$(r): F(r')=F(r)^F(c) and free_var(F(r'))=free_var (formula(r)).

r'=$\Pi_{p1, \ldots, pn}$(r): F(r')=$\exists \vec{X}$(F(r)^C) where C is the formula $\wedge_{i=1}^n$"($p_i$) and $\vec{Y}=\cup_{i=1}^n$"E($p_i$) $\vec{X}$ is the set of variables y such that y is not in {F($p_i$):1≦i≦n}, and such that y appears either in $\vec{Y}$ or in F(r) as a free variable. F(p) is a single variable for each i=1, ..., n. Define free_var(F (r'))=(F($p_1$), ..., F($p_n$)).

r'=$r_1 \times r_2$: In this case, the object relational map verification system assumes that the formulae F($r_1$) and F($r_2$) do not have any common free variables. If this condition is not satisfied, the variables are renamed to satisfy this property. The object relational map verification system can define F(r')=F($r_1$)∨F($r_2$), and free_var(F(r')) is obtained by concatenating the vectors free_var(F($r_1$)) and free_var(F($r_2$)) in that order.

r'=$r_1 \cup r_2$ or r'=$r_1 \setminus r_2$: If r'=$r_1 \cup r_2$ then F(r')=F(r')∧F($r_2$). If r'=$r_1 \setminus r_2$ then F(r')=F($r_1$)∧¬F($r_2$). Here, the object relational map verification system assumes that free_var(F ($r_1$))=free_var(F($r_2$)). It defines free_var(F(r'))=free_var (F($r_1$)).

Now define the translation for entity expressions. For an entity expression e, F(e'), E(e'), and B(e') are defined inductively as follows. Assume that these definitions are given in the context of the ERA expression r. If e' is not a legal entity expression in r, then F(e')=Null, B(e')=true, and E(e')=∅. If e' is a legal entity expression in r, then the values are defined as follows:

e'=s: F(e')=id(eid, s·1, ..., s·n), B(e')=true, and E(e')=∅ where expr_type(s,r)=id($\tau_1, \ldots, \tau_n$) and eid is the entity set referenced by s in r.

e'=treat e as $\tau$: If $\tau$ is a supertype of expr_type(e,r), then F(e')=F(e), B(e')=B(e), and E(e')=E(e) where $\tau$=id' $(\tau_1', \ldots, \tau_n')$, F(e)=id(u, v·1, ..., v·m) for some u, v, m, and u can be a constant or a variable. The object relational map verification system can assume that $\tau$ is a subtype of type(u) and hence n>m. If the entity belongs to the subtype $\tau$, then the additional attributes of the entity are retrieved, otherwise null values are retrieved. This is done by defining F(e') and B(e') as follows:

F(e')=id'(u, v·1, ..., v·n); and

B(e')=B(e)∨(id'(u, v·1, ·, v·n)∨g)

where g=¬∃$y_{m+1}, \ldots, y_n$id'(u, v·1, ..., v·m, $y_{m+1}, \ldots, y_n$)∨$_{m<i≦n}$(v·i=cNull)

E(e')=E(e)∪{v·j:m<j≦n}.

e'=*p: Let expr_type(p,r)=ref$_\tau$, where $\tau$=id($\tau_1, \ldots, \tau_n$), key($\tau$)=($i_1, \ldots, i_k$) and v and j be new names. key($\tau$) gives the attributes of the key. In this case, F(p) is a variable. Using the relation pkey$_\tau$ that relates pointers to key values of entities, the object relational map verification system retrieves the key fields, the entity name, and the entity. If this is a dangling pointer, then the object relational map verification system retrieves Null values. This is done by defining B(e') appropriately.

F(e')=id(j,v·1, ..., v·n);

B(e')::=B(p)∨g∧h) where g=pkey$_\tau$(j, F(p), v·$i_1, \ldots,$ v·$i_k$) ∨id(j, v·1, ..., v·n) and h=(¬(j', $y_1, \ldots, y_k$)pkey$_\tau$(j', F(p), $y_1, \ldots, y_k$)∨$_{≦i≦n}$ ((v·i=cNull));

E(e')=E(p)∪{j, v·1, ..., v·n}.

The object relational map verification system then translates property expressions. For a property expression p, F(p), B(p), and E(p) are defined as follows:

p=f: F(p)=F(f), B(p)=B(f), and E(p)=E(f).

p=&e: Let F(e)=id(u, v·1, ..., v·n) for some id, u, v and n, where u can be a variable or an entity name. Let expr_type(e,r)=$\tau$=id($\tau_1, \ldots, \tau_n$), key($\tau$)=($i_1, \ldots, i_k$) and x be a new first order variable. Using the key values of u and the relation pkey$_\tau$, the object relational map verification system can retrieve the pointer to e by appropriately defining B(e).

F(p)=x;
B(p)=B(e)∨pkey$_\tau$(u, x, v·i$_1$, ..., v·i$_k$);
E(p)=E(e)∪{x}.

For any field expression f', F(f'), B(f'), and E(f') are defined as follows:

f'=e·k: when F(e)=Null, e is not legal but e·k or a subattribute of it is a variable in Var(r). In this case, the object relational map verification system can define F(f') e·k, B(f')=true, and E(f')=∅. When F(e)=id(u, v·1, ..., v·n) for some u, v, n, the object relational map verification system can define F(f') to be v·k, B(f')=B(e), and E(f')=E(e).

f'=f·k: If f is not legal in r, then F(f')=f·k, B(f')=true, and E(f')=∅. Otherwise, f is an attribute of complex type whose subfields are stored in the relation id and expr_type(f,r)=id($\tau_1$, ..., $\tau_n$). The attribute f is a key of this relation and the subfield f·k is retrieved from this relation. This is achieved using B(f').
F(f')=f·k;
B(f')=B(f)∨g where g=id(f, f·1, ..., f·n)∨
(∧∃y$_1$, ..., y$_n$id(f, y$_1$, ..., y$_n$)∨$_{j=1}$"(f·j=cNull)). The first disjunct in g retrieves the subfields from the relation id and the second retrieves null values if no such tuple exists in id; and
E(f')=E(f)∪{f·1, ..., f·n}.

F(c), B(c), and E(c) are defined for a condition c. All the bindings of various fields referenced in c are merged with the main formula and all existential variables are existentially quantified.

c=IsNull(p): F(c)=∃E(p)(B(p)∨(F(p)=cNull)).
c=IsOf(e,r): where $\tau$=id'($\tau_1$', ..., $\tau_n$') and F(e)=id(u, v·1, ..., v·m) for some u, v, m.

The object relational map verification system will now be described with reference to the Figures. FIG. 1 is a block diagram illustrating components of an object relational map verification system in various embodiments. The object relational map verification system 100 can include source code 102 (or object code) specifying an object, a database 104 having a database schema, an analyzer component 106, a theorem prover component 108, and a model generator component 110. These components will now be described in further detail.

The source code or object code can employ an object relational map to map the object's attributes to information in the database schema. As an example, the code may employ a library of classes to map attributes to portions of a database, such as tables or columns. The database can be a relational or other type of database, such as a relational database that employs MICROSOFT SQL SERVER®. The database can also be a document, such as an extensible markup language (XML) document. An analyzer component can analyze source code, object code, or the database to produce one or more corresponding first order logic formulae. In some embodiments, the analyzer component can receive first order logic formulae from a software developer. The theorem prover component proves theorems associated with expressed first order logic formulae. In some embodiments, the object relational map verification system may employ conventional theorem provers. The model generator component can generate a model, such as a model having counterexamples that demonstrate that the object relational map is invalid. In some embodiments, the object relational map verification system can employ conventional satisfiability problem solvers to assist in generating models.

The computing devices on which the object relational map verification system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the object relational map verification system. In addition, the data structures and message structures may be stored or transmitted via a data transmission medium, such as a signal on a communications link. Various communications links may be employed, such as the Internet, a local area network, a wide area network, or a point-to-point dial-up connection.

The object relational map verification system may use various computing systems or devices, including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The object relational map verification system may also provide its services to various computing systems, such as personal computers, cell phones, personal digital assistants, consumer electronics, home automation devices, and so on.

The object relational map verification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
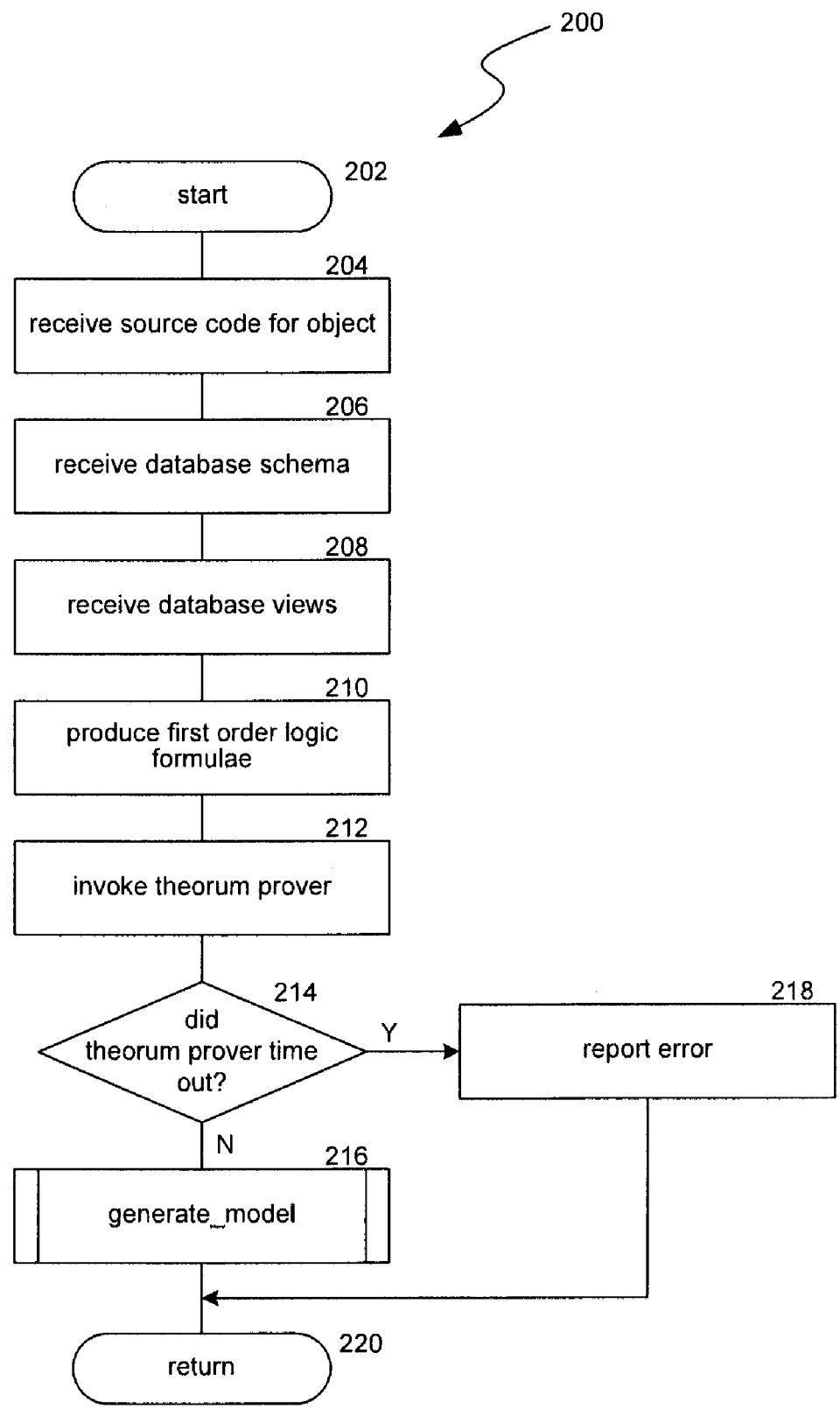
FIG. 2 is a flow diagram illustrating a verify routine invoked by the object relational map verification system in some embodiments.

FIG. 2 is a flow diagram illustrating a verify routine invoked by the object relational map verification system in some embodiments. The object relational map verification system can invoke the verify routine 200 when a software developer commands the object relational map verification system to verify an object relational map. The routine begins at block 202. At block 204, the routine receives source code for an object. In some embodiments, the routine receives object code for the object. At block 206, the routine receives a database schema for a database into which the object stores data or from which the object retrieves data. In some embodiments, the routine receives an indication of a database and determines the schema, such as by evaluating the configuration of the database. At block 208, the routine receives database views corresponding to the retrieval and storage operations that are made to retrieve or store data relating to the object. The routine may receive these update and query views by analyzing an object relational map corresponding to the object. At block 210, the routine produces first order logic formulae corresponding to the object relational map. In various embodiments, the routine may produce the first order logic formulae or may receive the first order logic formulae from a software developer. At block 212, the routine can invoke a theorem prover to prove the first order logic formulae. In some embodiments, the routine can employ conventional theorem provers. At decision block 214, the routine determines whether the theorem prover timed out. As an example, if the theorem prover is taking an excessive amount of time, the object relational map verification system may determine that the theorem prover cannot verify the object relational map. Alternatively, the theorem prover may return an error indicating that it could not verify the object relational map. When this is the case, the routine continues at block 218. Otherwise, the routine continues at block 216. At block 216, the routine invokes a generate_model subroutine to identify counterexamples that demonstrate that the object relational map is incorrect. The generate_model subroutine is described in further detail below in relation to FIG. 3. The routine then continues at block 220, where it returns. At block 218, the routine reports an error indicating that the object relational map could not be verified and then continues at block 220.

Figure 3:
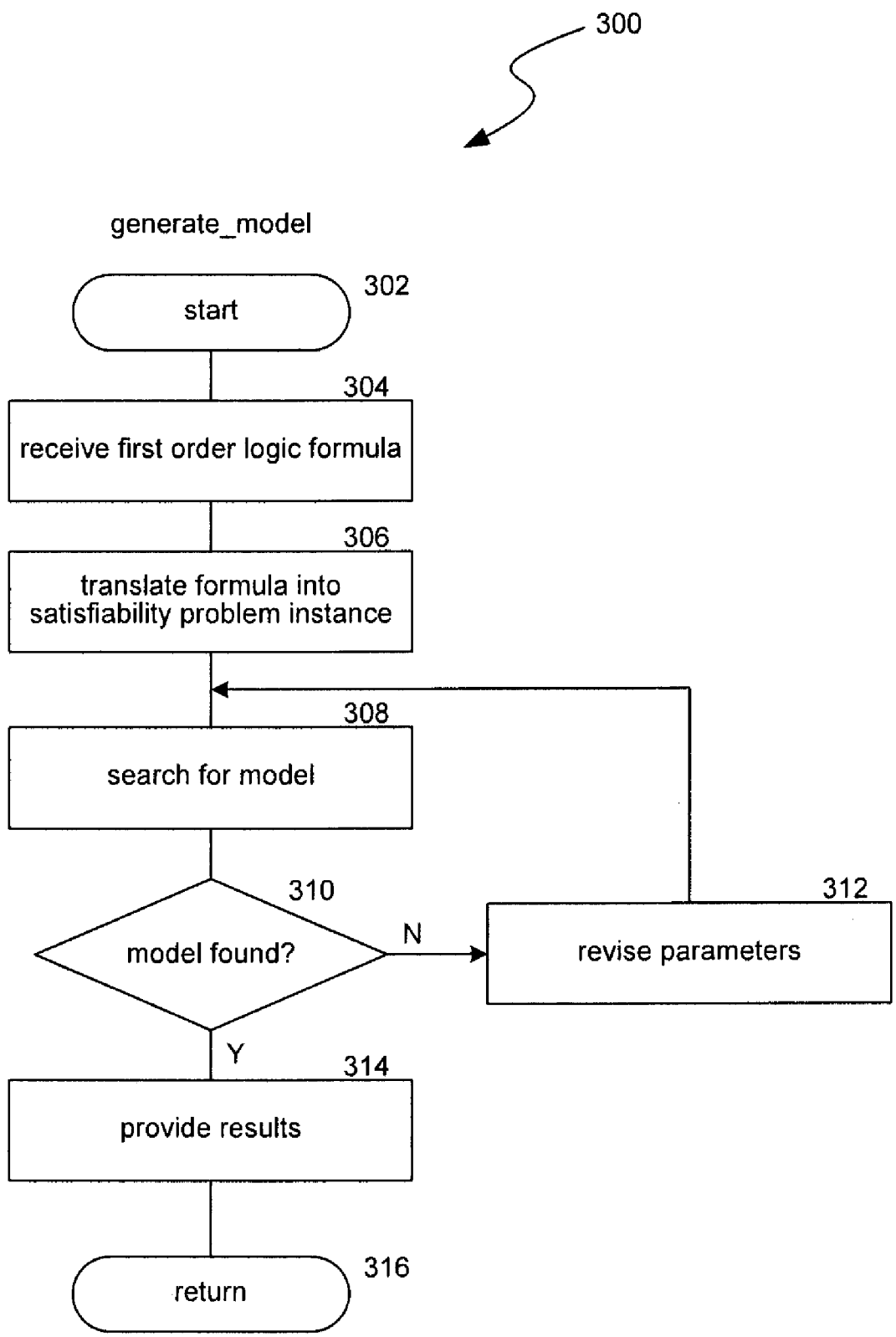
FIG. 3 is a flow diagram illustrating a generate_model routine invoked by the object relational map verification system in some embodiments.

FIG. 3 is a flow diagram illustrating a generate_model routine invoked by the object relational map verification system in some embodiments. The object relational map verification system can invoke the generate_model routine 300 to generate a model containing a counterexample that demonstrates that an object relational map is invalid. The routine begins at block 302. At block 304, the routine receives a first order logic formula. This first order logic formula can be equivalent to the first order logic formula that the verify routine described above in relation to FIG. 2 received or produced at block 210. At block 306, the routine translates the first order logic formula into a satisfiability problem instance. The object relational map verification system translates a first order logic formula into a satisfiability problem instance by translating each predicate of the first order logic formula into a set of k rows. Each row is a set of tuples identifying a relation between objects and database portions and contains a Boolean variable indicating whether that row is valid, and a set of variables can be evaluated to determine validity. There may also be a set of constants relating to each row. The object relational map verification system can encode a first order logic formula into a quantified Boolean formula and then convert the quantified Boolean formula into a satisfiability problem instance. The object relational map verification system can employ binary decision diagrams to compute quantifications. At block 308, the routine searches for a model. The routine may employ a conventional satisfiability problem solver to identify a model. At decision block 310, the routine determines whether a model could be found. If no model could be found, the routine continues at block 312. Otherwise, the routine provides the model at block 314 and returns at block 316. At block 312, the routine revises the maximum bound on the number of tuples or the number of constants and returns to block 308.

Thus, the object relational map verification system can verify object relational models and create models containing counterexamples when an object relational model cannot be verified.

Although the embodiments illustrate mapping objects to databases, one skilled in the art will recognize that the described techniques apply equally to translations between any two different types of data. As examples, the technique can be applied to verify correct database use after a database migration, conversion of data between two different network protocols, and so forth. In some embodiments, the object relational map verification system can receive first order logic formulae from software developers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computer system for verifying an object relational map for software, comprising:
receiving by the computer system an object employed by the software;
receiving a database schema, the database schema specifying portions of a database into which an attribute of the received object will be stored or from which the attribute of the received object will be retrieved;
receiving a query view that specifies in a query language what is retrieved from the database;
receiving an update view that specifies in the query language what is stored in the database;
generating a first order logic formula corresponding to the received object, database schema, query view, and update view, the first order logic formula expressing the object relational map formulaically; and
proving a theorem indicated by the generated first order logic formula by invoking a first order logic formula theorem prover, wherein when the theorem is proved, the object relational map is verified and generating a model when the theorem could not be proved.

2. The method of claim 1 wherein generating the model further comprises:
translating the generated first order logic formula into a Boolean satisfiability problem instance; and
searching for the model.

3. The method of claim 2 wherein the searching is performed by a Boolean satisfiability problem solver.

4. The method of claim 2 wherein the translating is parameterized by a maximum bound on a number of tuples in a set of relations identified by the first order logic formula.

5. The method of claim 2 wherein the translating is parameterized by a number of constants in a set of constants identified by the first order logic formula.

6. The method of claim 2 wherein the translating further comprises encoding the first order logic formula into a quantified Boolean formula and converting the quantified Boolean formula into the satisfiability problem instance.

7. The method of claim 6 wherein the encoding further comprises representing quantifications in a binary decision diagram.

8. The method of claim 6 wherein the encoding further comprises representing quantifications in a binary decision diagram and converting the binary decision diagram into a set of conjunctive normal form clauses and providing the conjunctive normal form clauses to a satisfiability problem solver.

9. The method of claim 2 wherein when a model cannot be found, increasing a number of tuples, increasing a number of constants, or increasing both and then again searching for the model.

10. A system for verifying an object relational map for software, comprising:
a memory and processor:
a database having a database schema that stores data employed by the software;
an object employed by the software for accessing the database; and
an analyzer that receives a query view that specifies in a query language what is retrieved from the database and an update view that specifies in the query language what is stored in the database, and generates a first order logic formula corresponding to the object, database schema, query view, and update view wherein the first order logic formula expresses the object relational map formulaically; and
a theorem prover that proves the generated first order logic formula.

11. The system of claim 10 further comprising a model generator that generates a counterexample.

12. The system of claim 10 further comprising a satisfiability problem solver that solves a satisfiability problem corresponding to the generated first order logic formula.

13. The system of claim 10 further comprising:
   a theorem prover that proves the generated first order logic formula;
   a model generator that generates a counterexample based on the generated first order logic formula; and
   a satisfiability problem solver that solves a satisfiability problem corresponding to the generated first order logic formula to generate a model identifying the counterexample.

14. A computer-readable medium storing computer-executable instructions that, when executed, cause a computer system to perform a method for verifying an object relational map for software, the method comprising:
   receiving source code defining an object employed by the software;
   determining a database schema, the database schema specifying portions of a database into which an attribute of the received object will be stored or from which the attribute of the received object will be retrieved;
   receiving a query view that specifies in a query language what is retrieved from the database and an update view that specifies in the query language what is stored in the database; and
   generating a first order logic formula corresponding to the received object, database schema, query view, and update view that is employed by a first order logic theorem prover to prove a theorem, the first order logic formula expressing the object relational map formulaically, wherein when the theorem is proved, the object relational map is verified.

15. The computer-readable medium of claim 14 wherein the method further comprises:
   translating the generated first order logic formula into a Boolean satisfiability problem instance; and
   searching by a Boolean satisfiability problem solver for a model that satisfies the satisfiability problem instance.

16. The computer-readable medium of claim 15 wherein the method further comprises identifying a counterexample.

17. The computer-readable medium of claim 15 wherein the method further comprises identifying a counterexample based on the model.

* * * * *

UNITED STATES PATENT AND TRADEMARK OFFICE
CERTIFICATE OF CORRECTION

| | | |
|---|---|---|
| PATENT NO. | : 7,702,695 B2 | Page 1 of 1 |
| APPLICATION NO. | : 11/769112 | |
| DATED | : April 20, 2010 | |
| INVENTOR(S) | : Krishna Mehra et al. | |

It is certified that error appears in the above-identified patent and that said Letters Patent is hereby corrected as shown below:

In column 14, line 51, in Claim 10, delete "processor:" and insert -- processor; --, therefor.

In column 14, line 55, in Claim 10, after "base;" delete "and".

Signed and Sealed this
Twenty-second Day of February, 2011

David J. Kappos
*Director of the United States Patent and Trademark Office*